United States Patent
Beth et al.

[15] 3,650,774
[45] Mar. 21, 1972

[54] FLAT END CASING SYSTEM AND METHOD OF USE

[72] Inventors: Donald Beth, 325 W. Parkwood Ave., Dayton, Ohio 35303; George P. Saliaris, 352 Schrock Rd., Worthington, Ohio; Ralph A. Welch, 2470 Lane Road, Columbus, Ohio 43220

[22] Filed: July 17, 1969

[21] Appl. No.: 842,606

[52] U.S. Cl. ................................ 99/174, 17/44.2, 53/37, 99/171 R, 99/175, 99/176, 99/178, 141/95, 198/131
[51] Int. Cl. ........................................................ B65b 25/06
[58] Field of Search .................. 141/94, 95, 68, 303; 99/176, 99/175, 174, 171, 178; 17/44.2, 44.3, 41, 42, 35; 53/37; 229/87 F, 5.7; 198/131

[56] References Cited

UNITED STATES PATENTS

| | | | |
|---|---|---|---|
| 2,751,306 | 6/1956 | Snyder | 99/176 X |
| 2,811,933 | 11/1957 | Prasz | 198/131 X |
| 2,879,593 | 3/1959 | Schwartz | 17/32 X |
| 2,886,073 | 5/1959 | Beck | 99/176 UX |
| 3,098,582 | 7/1963 | Martin | 220/67 |
| 3,111,240 | 11/1963 | Whitton, Jr. | 220/67 |
| 3,134,681 | 5/1964 | Hawley | 99/176 X |
| 3,207,188 | 9/1965 | Brown | 141/303 X |
| 3,233,281 | 2/1966 | Swift | 17/44.2 |
| 3,452,897 | 7/1969 | Anthony | 220/67 |

*Primary Examiner*—Frank W. Lutter
*Assistant Examiner*—Steven L. Weinstein
*Attorney*—Fidelman, Wolffe & Leitner

[57] ABSTRACT

A flat ended casing system having planar plastic end plates mounted on the ends of a hollow food product casing. The end plates are attached to the hollow casing around their periphery. One end plate has a filling valve through which a moldable food product is inserted into the casing and the casing is filled. Upon completion of the filling operation the valve is closed and the filled casing is ready for further processing.

23 Claims, 18 Drawing Figures

Patented March 21, 1972
3,650,774
3 Sheets-Sheet 1
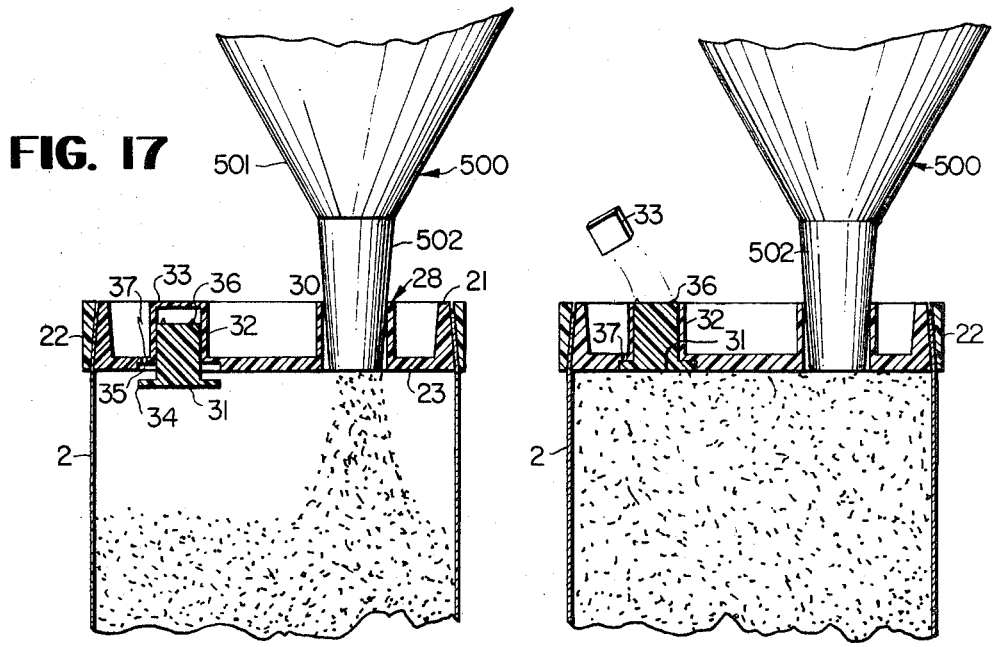
FIG. 17
FIG. 18
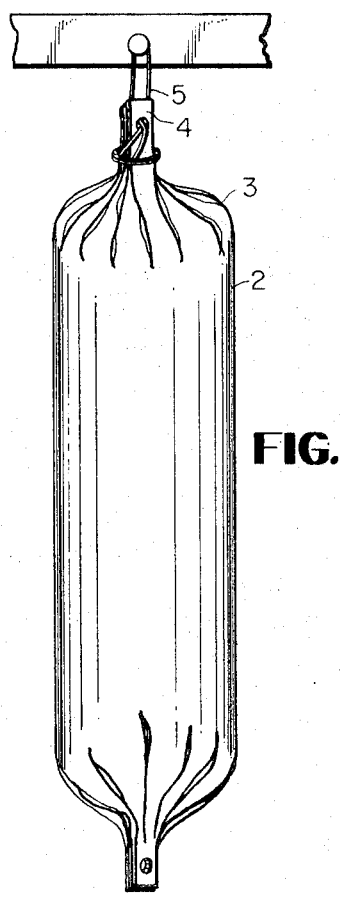
FIG. 1
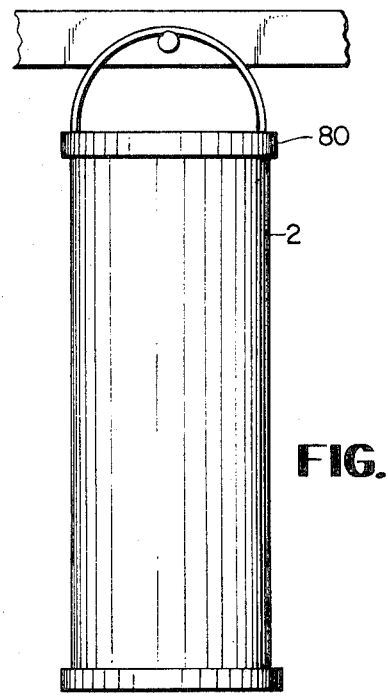
FIG. 16
INVENTOR.
DONALD W. BETH
GEORGE P. SALIARIS
RALPH A. WELCH
BY
ATTORNEYS Patented March 21, 1972 3,650,774
3 Sheets-Sheet 2
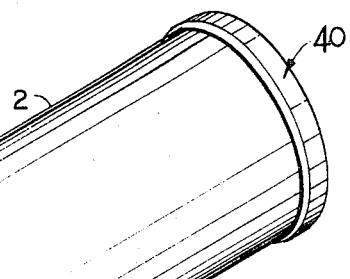
FIG. 2
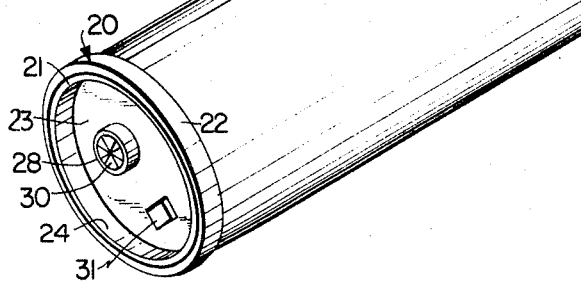
FIG. 5
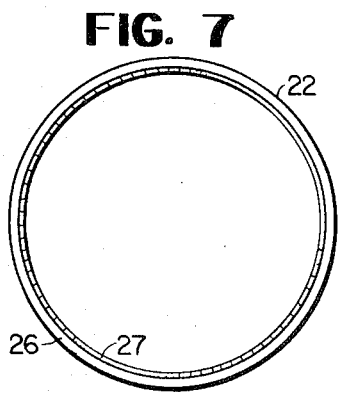
FIG. 7
FIG. 3
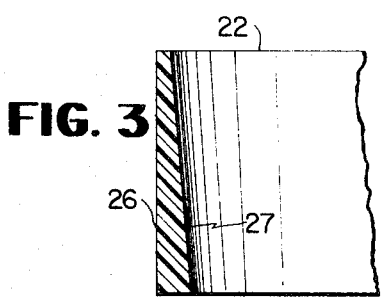
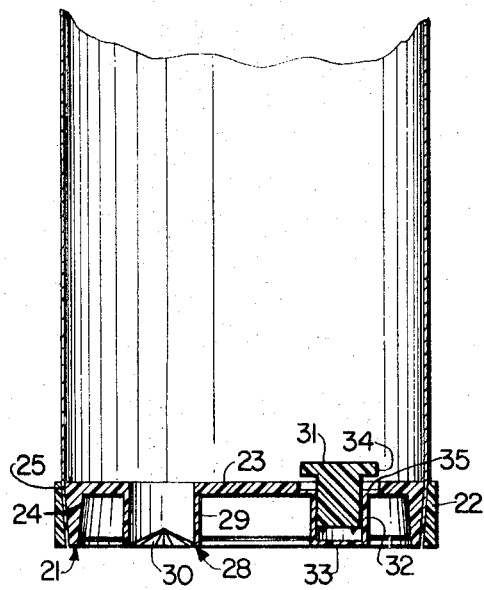
FIG. 6
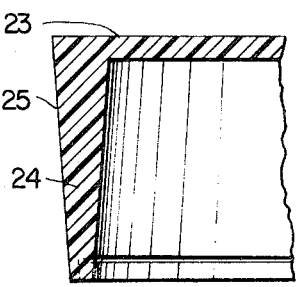
FIG. 4
INVENTOR.
DONALD W. BETH
BY GEORGE P. SALIARIS
RALPH A. WELCH
Friedman, Wolffe & Leitner
ATTORNEYS Patented March 21, 1972  3,650,774

INVENTOR.
DONALD W. BETH
GEORGE P. SALIARIS
RALPH A. WELCH
BY
Fudelman, Welte & Leitner
ATTORNEYS

FLAT END CASING SYSTEM AND METHOD OF USE

This invention is directed to a method of filling meat casings and a unique casing structure that provides a flat ended food product upon the initial casing filling.

Until the development of the instant casing system and method of usage, it has been customary in the food industry, particularly in meat packing where casings are filled with raw sausage or baloney substances, e.g., to first tie one end of the casing, fill the casing with the food product, and then tie off the other end of the casing. The filled casing was then processed further, such as pasturizing the product by a smoking operation. After further processing, the treated casings of food product are either sold within the casing for treatment by a retailer, such as a butcher, the casing removed, the product sliced, and the slices packaged in small portions for distribution to retailers.

The disadvantages in the procedure up to now are many and it is these problems to which the instant system and method are addressed.

Taking the meat packing industry as an example, it is customary practice in the industry to combine the left-over portions of steers or hogs into sausage, baloney, meat spreads, etc. This is due to the fact that a packer buys animals for slaughter by the pound and he attempts to utilize as much of the animal as possible in order to get the largest return on his investment possible. It is also due to the fact that the public will only entertain eating such cuts as tripe, stomach, brain, etc., in a disguised form, such as baloney, which contains artificial flavoring and fillers in addition to the cuts enumerated above.

The normal procedure is to take the cuts, fillers and flavoring and blend them with a blender which grinds up the cuts into a form similar to hamburger. The ground mixture is then fed to an emulsifier which pulverizes the mixture into a soft, moldable paste. The paste is then fed into a filler by means of a vacuum pump or the like. The filler has a filling nozzle, called a "horn" projecting therefrom. The horn usually extends over a table where the casings are filled, the casings at this point having been tied at one end by a machine known in the industry as a "first-tie machine". The tie may be a mere stapling operation which clips the pinched end of the casing or it may puncture the pinched end, insert an eyelet and insert a string loop. All of the presently used methods of making a first tie provide a strand loop to be used for vertically hanging the filled casing, where the casings are to be hung vertically in the smokeroom. If the filled casings are to be loaded on horizontal racks in preparation for smoking, no hanging loops are provided.

The filling operation is attended by two people usually. One attendant grabs the tied casings and slips them over the horn which can be from a half a foot to over a foot in length. The other attendant then grabs the open end of the casing, actuates the filler, holds the casing end as the casing is being filled with paste, turns off the filler, slides the filled casing off the "horn", pinches the casing end and then "ties" the end by a "second-tie machine" which, again may crimp the pinched end with a staple. As the filler operator is crimping the pinched end, the first attendant is sliding a new casing over the "horn". When the filled casings are tied, the operator slides them down a table to a third attendant who loads them on a smoking rack. The meat paste inside the casing at this point has rounded ends.

After the smoking operation the filled casings are in most cases, stripped off and the length of meat product is run through a slicer. The rounded end portions of the meat product are sliced off initially and are added to a batch of raw cuts to be fed to the blender. The reason for this is obvious inasmuch as uniform diameter slices cannot be obtained from the end portions. The remaining meat product is sliced and packaged by weight amounts for direct shipment to the retailer. In some cases however, the filled and processed casing is shipped directly to the retailer such as in the case of certain specialty sausages. The retailer then slices the length of meat product. Again, the end portions are not usually sold with the sliced meat or pork and are either discarded, ground up as meat spread, or sold at discount.

The present invention eliminates many of the problems encountered in the procedures and products described above.

With the instant casing structure, the problem of the rounded ends on a filled casing is eliminated. There is no waste since the ends are flat and the first slice taken off the loaf of meat product is of uniform diameter and does not have to be reprocessed, as in the case of a meat packing operation, or discarded as in the above-described food retailing operation. In the slicing operation at the meat packing plant, there is better weight control per package of sliced meat because of the more uniform density of the loaf. With the old tie methods, the loaf density varied tremendously near the ends thereof. This was in part due to the judgment the filler had to make in leaving enough casing during the filling operation so that he could tie off the second end.

Another major advantage to using the instant system and method is in the elimination of casing waste. The casings used presently are made of synthetic or natural ingredients or a combination of both. They may cost ½ a cent per inch or more. For example, on a 30 inch casing, seven inches of it are waste. With the instant structure, less casing is needed for the same length of loaf.

The present structure also eliminates the cost and labor involved in making "first and second ties". Packers either make their own first tie or send their casings out to a company specializing in tying casings. With the present invention the packers can use the casings as they purchase them, nor is there the necessity of the filling attendant making a "second tie". This will also eliminate the need for the attendant who slipped the casings over the horn. With the instant casing structure, the filling attendant need merely to fit the end plate valve over the horn and fill the casing.

An increase in production is inherent in the use of the instant device and method. For example, an increase of from 1,000 to 2,000 pounds of product per 1,000 casings can be expected.

The instant device eliminates the need for reworking the cutoff rounded ends by the packer. Reworking results in changes of consistency and flavor of the meat product. Thus, better quality control is achieved.

A more uniform finish and coloring on the processed loaf is available with instant structure. The center of the loaf should have a color distinct from the periphery which was not as easily attained with prior methods. These factors can be checked easily with using the instant casing structure.

Other results obtainable by the use of this structure and method are a product which more aesthetic appeal, a cost savings by the packer which is passed onto the butcher or retailer, easier handling, packaging and crating for shipping purposes.

It is, therefore, a principal object of this invention to provide an improved casing structure and method of manufacturing loafed food products.

It is a further object of this invention to provide a casing structure having flat end portions thereby eliminating rounded end portions on food product loaves and the inherent waste of food product and casing material.

It is still a further object of this invention to provide an improved casing structure and method of making food product loaves which results in increased production, less labor involvement and cheaper production costs.

It is another object of this invention to provide a casing structure and method of filling casings which insures a uniform density food product of more uniform finish and coloring.

It is another object of this invention to provide a casing structure and method of filling casings which eliminates the need for tying the ends of such casings.

Further objects and advantages of the present invention will be apparent from the following description, reference being had to the accompanying drawings wherein preferred forms of the present invention are clearly shown.

Referring now to the drawings in which:

FIG. 1 is a perspective view of a conventional casing used in the meat packing industry at present;

FIG. 2 is a perspective view of the casing of this invention showing one embodiment of the filling valve;

FIG. 3 is a partial cross sectional view of the wedging ring;

FIG. 4 is a partial cross sectional view of a typical end plate used in this casing;

FIG. 5 is a plan view of an end plate of one embodiment of the filling end plate;

FIG. 6 is a partial cross sectional view of the casing system employing the filling end plate of FIG. 5;

FIG. 7 is a plan view of the wedging ring;

FIG. 16 is a perspective view showing a casing system employing an end plate of FIG. 10 hanging on a smoke rack;

FIG. 17 is a partial cross sectional view of a casing being filled with a food product; and FIG. 18 is a partial cross sectional view of the filling operation of FIG. 17 at a latter stage.

Figure 10:
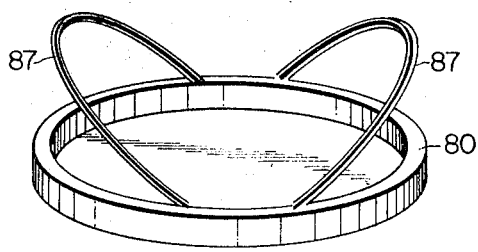
FIG. 10 is a perspective view of one embodiment of the hanging end plate of the present casing system.

Referring to FIG. 1, there is shown a casing employing a tied off end which is conventional in the present day meat packing industry. The system consists of a casing 2 which is pinched together at the end which is indicated by 3 and riveted at 4. The rivet 4 accommodates a hanging strand or loop 5. Other means such as staples or slips can be used to seal the ends of the casing 2. In some cases the end is merely tied off with a knotted cord which is then looped and tied again to form a hanging loop.

An embodiment of the present invention is shown in FIG. 2. It consists of casing 2 filling end plate 20 and hanging end plate 40. End plate 20 consists of lid 21 and wedging ring 22. Lid 21 is disc shaped with a circular planar section 23 and flange portion 24. The outside of the peripheral surface 25 of flange 24 is tapered as shown in FIG. 6. Wedging ring 22 is a constant diameter outer peripheral surface 26 and a tapered inner surface 27 as is illustrated in FIG. 3. Lid 21 has a filling valve such as flutter valve 28 shown in FIGS. 5 and 6. Valve 28 consists of a cylindrical portion 29, the end of which mounts a series of integrally cast sections 30. Sections 30 in their normal condition seal off the outer end of portions 29 due to their resiliency. The other end of portion 29 is in open communication with the interior of casing 2. Also mounted on lid 21 is pop-out plug 31. Pop-out plug 31 is employed as an indicating means to signal the filling operator that the casing is filled to capacity. The plug may be of any cross sectional shape but is shown as square in the present embodiment. The plug is frictionally mounted for sliding movement under pressure from the food product being introduced in the casing. The plug is frictionally mounted within housing 32 for sliding movement. Housing 32 is of the same cross sectional configuration as plug 31 and contains frangible end portion 33, which breaks away when the plug is forced all the way up into housing 32. Plug 31 has a flange portion 34 which is adapted to mate with relieved area 35 and planar portion 23 of lid 21.

The ends of the casing 2 are frictionally held between tapered surface 25 of the lid flange 24 and the tapered inner surface of wedging ring 22. This is best seen in FIG. 6. The greater the internal pressure within casing 2 tending to force lid 21 out of the casing, the greater the wedging action on the ends of the casing by the tapered surfaces of the lid and the wedging ring.

Figure 8:
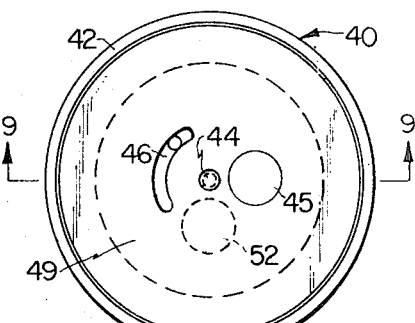
FIG. 8 is a plan view of another embodiment of the filling end plate of this invention.
Figure 9:
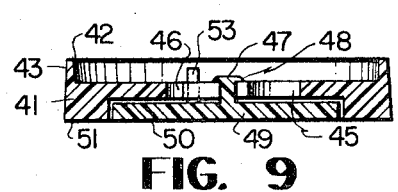
FIG. 9 is a cross sectional view taken along lines 9—9 of FIG. 8.

In FIG. 8 there is shown a second embodiment of the filling lid generally designated as 40. It consists of a planar portion 41 and a flange 42 having a tapered outer peripheral surface 43. Section 41 has a center aperture 44, a larger filling aperture 45, and a concentric slot 46. Aperture 44 receives the pivot stud 47 of rotary gate member 49. As shown in FIG. 9, rotary gate member 49 has an inner surface 50 which is coplanar with the inner surface 51 of plate 40. Rotary gate member 49 is mounted for pivoted movement about stud 47, and is generally circular and plan view as shown by the dotted lines in FIG. 8. Gate member 49 has an aperture 52 therein which, when aligned with aperture 45 end plate 4 allows food material to be inserted within the casing. Gate member 49 has a projection 53 riding in slot 46 which allows the operator to open and shut the gate member. Stud member 47 is peened over as at 48 to retain gate member 49 on plate 40. Naturally, gate member 49 can be of any configuration as long as it has the ability to allow passage of filling material into the casing and then seal off aperture 44 at the end of the filling operation.

Figure 11:
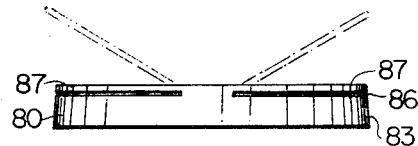
FIG. 11 is a side view of the end plate shown in FIG. 10.
Figure 12:
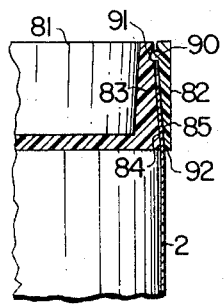
FIG. 12 is a partial cross sectional view of a modification in the end plate and wedging ring showing a modification in the wedging surfaces.

Hanging plate 80 is shown in FIGS. 10, 11 and 12. It consists of a lid member 81 and a sealing ring 82. Lid member 81 has a flange 83 having a tapered peripheral outer surface 84. Wedging member 82 has a tapered inner surface 85 which coacts with surface 84 to produce a wedging action on casing 2. Plate 80 is two semicircular slots across the upper extremities of flange 83. Plate 80 is made of resilient material which allows the portions thereof above slots 86 to be resiliently lifted up to produce hanging loops 87. In FIG. 11 the solid lines indicate loops 87 in their relaxed condition while the dotted lines show the loops under tension.

The loops may be fabricated in any suitable manner, may be integrally cast with the end plate or may be of any other material, such as plastic, cord, metal, etc. Such hanging loops are only required when the filled casings are to be hung vertically for further processing. If the filled casings are to be stacked horizontally on racks there is no need to provide hanging loops or a single loop on the end plate.

Figure 14:
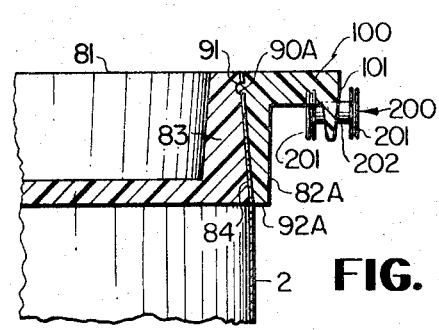
FIG. 14 is a partial cross sectional view of the hanging end plate of FIG. 13 showing the end plate engaged in a conveyor chain.

In FIGS. 12 and 14 there is shown a further innovation in securely locking the casing ends between the lid member and the wedging ring. An annular projection 90 may be provided on the inner surface 85 of wedging ring 82. A complimentary relief cut 91 may be made on the tapered surface 84 of lid 81. When the lid and wedging members are fitted together projection 90 snaps into cut 91 thereby insuring that wedging ring 82 will not be knocked off the casing end and lid by a jar or impact on its inner leading edge 92. Of course a projection can be provided in the form of individual projections on the inner tapered surface of the wedging ring and the cut 91 can be a series of spaced depressions on the tapered surface of the lid. Such an additional locking feature can be employed on one end plate or both.

Figure 13:
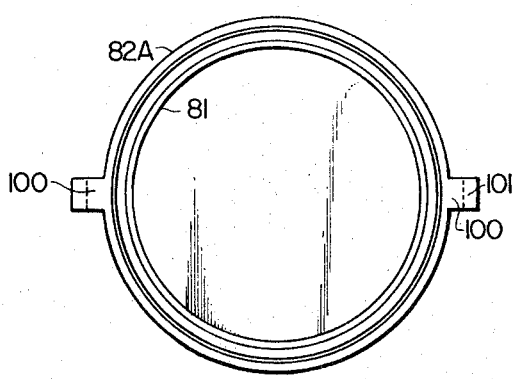
FIG. 13 is a plan view showing a second embodiment of the hanging end plate.
Figure 15:
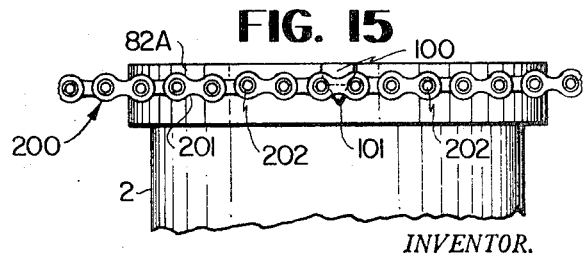
FIG. 15 is a side view of the end plate embodiment of FIG. 13 showing the same engaged in a chain conveyor.

Referring now to FIGS. 13 and 14, there is shown another embodiment of the hanging end plate. The lid 81 is shown in FIGS. 13 and 14, except that it is not slotted at 86 to provide hanging loops as at 87. A modified wedging ring 82a is used which is identical to wedging ring 82 and additionally includes conveyor studs 100. Conveyor studs extend out from wedging ring 82a and are spaced 180° apart to support the filled casing in a balanced fashion. Conveyor studs 100 have tapered projections 101 extending therefrom. Conveyor chains 200 are provided on each side of the casing. The chains may be conventional chain links with links 201 and connecting rivets 202. The projections 101 on stud 100 are adapted to fit down between parallel links 201 and spaced rivets 202 as shown in FIG. 15. This hanging end plate is used to support the unfilled and filled casings on a chain conveyor system or the like in a fully automated filling system. All that is required to fully automate the casing filling is a conveyor means, means to support the filling end plate on the conveyor means, a flutter valve such as shown in FIGS. 2, 5 and 6. A trip projection on the filling plate to activate a mechanism to lower a filling horn down into the unfilled casing and a pressure sensing device to shut off the flow of materials from the filling horn into the casing and advance the filled casing, bringing another unfilled casing underneath the filling horn. All of such means are conventional and are available commercially. The trip mechanism may be a simple microswitch which is engaged by a projection on a filling plate to stop the conveyor means, lower the filling horn and start the flow of materials. The pressure sensing device may be the pop-out plug which activates another system through a microswitch to stop the filling of a material, lift the filling horn out of the end plate, and advance the filling casing.

FIGS. 17 and 18 show two stages in a filling operation. A filling end plate such as that shown in FIG. 6 is used. A filling horn 500 is used to inject material into the casing. Horn 500 has a tapered portion 501 and a cylindrical or slightly tapered section 502. Section 502 is inserted through the resilient portions 30 of flutter valve 28. It may extend into the valve only as far as planar surface 32 of lid 21 or may extend further into the casing. Lid 21 contains a pop-out plug 31 having projections 36 at the top thereof. Projections 36 are designed to aid in pushing out flangible sections 33 when the casing is filled. An air venting hole 37 extends from the leaves relieved area 35 of the lid to the outer surface of the lid. This is to allow the end trapped bulk air to escape while the casing is being filled. When the pop-out plug 31 is forced up into housing 32, flange 34 will seal off venting holes 37 as shown in FIG. 18. After the flangible section 33 breaks away, the filling operation slides the filled casing off of horn section 502 and resilient portions 30 return to their normal state and seal the valve 28. Since the sections 30 are wedge-shaped and project downwardly into valve 28, any force exerted by the filling material will tend to wedge the members 30 more tightly to one another thereby sealing the valve more securely.

Although several embodiments of the casing system, filling end plate, filling valve, and hanging end plate have been shown, the system can be modified to use different valve embodiments and the like within the knowledge of a person skilled in the art.

For example, the filling horn may have a limit stop thereon to limit its penetration within the casing and the stop may be constructed to lock onto a portion of the lid structure so that the operator in a hand filling operation does not have to hold the casing on the filling horn. Additionally the lock may be made resilient and designed to give way when the pressure forcing the filled casing off the horn due to the directional flow of the filling material reaches a predetermined amount, thus causing the filled casing to slide off the horn.

The end plates may be constructed of any material such as plastic, metal, paper, reinforced cardboard, or wood. Preferably they would be constructed of a plastic material such as polypropylene, polystyrene, high density polyurethane, etc.

The system end plates are adaptable for use with any type of casing material available presently, such as natural casings, plastic, and those containing a fibrous cellulose collogen.

While the method of attaching the casing to the lids in the described embodiments have involved the use of tapered wedging rings, any method of attachment may be used, such as a pure friction fit, O-rings in conjunction with annular groove, or by crimping the casing onto the lid. The casing material may be welded to the end plate or a heat seal may be used. The casing ends can also be heat shrunk onto the casing. Additionally, any adhesive connection may be used. Generally, the only requirements for the method of attachment are that the connection withstand the pressures caused by the filled food product on the ends of the casing and, if the filled casing is to be hung vertically during further processing, the method of connection must be such that it will withstand the weight of the filled casing.

The configuration of the end plates need not necessarily be circular but may be square, oval, or any other desired shape.

The filling valve can be of any construction, although an automatically closing valve is desirable. The filling plate may simply have a filling aperture with an integrally molded cap and tab attached thereto, such as used on soft drink bottles. Alternative arrangements could include a sideslip type of closure such as utilized in pepper cans.

Both the upper and lower end plates may be provided with suitable hanger loops which may be either integrally formed with the end plates or attachable thereto. These may either be rigid or flexible in order to allow for different modes for hanging the filling casing. A simple metal hook may be secured to the end plate or, an apertured projection tab with a loop of cord secured thereto.

The pop-out plug described in the shown embodiments is optional and serves only to indicate a predetermined pressure within the filled casing. Sausage material is introduced into the aperture of the filling end plate until the device is filled as indicated either by the pop-out plug, a side protuberance, back pressure on the filling horn, mere visual inspection, or by precontrolled feed amounts.

As described the filling operation may be completely automated with the employment of the instant casing system. The filling horn may be supplied directly from the emulsifier and mounted for reciprocal automatic movement into and out of the filling apertures of the individual casing. The system can be simply a straight conveyor as shown in FIGS. 14 or 15 or, may be a rotary indexing wheel such as those commonly employed in the can and bottle filling industry.

The casings may be provided with only one end plate in special applications such as where sizing members are used to prevent bulging, to control density, and to provide a smooth siding casing. When only one end plate is used, the other end of the casing would be tied off by conventional tying techniques.

While the invention has been described as applicable to the meat packing industry, it may be used in other food industry areas. The system can be used in the manufacture of cheese, spreads, puddings, gelatins, dough, cereals, blends, meals, and confectionary products.

What is claimed is:

1. An improved casing structure for meat products comprising a hollow, flexible casing of a predetermined length, plate means on the opposite ends of said casing, said plate means having inner facing planar surfaces, means securing the ends of the casing to the plate means and gate means in one of said plate means to allow a meat product paste to be inserted into the casing structure to fill it and further including a frangible section in the plate means containing said gate means, and a frictionally mounted pop-out plug in the plate means containing said gate means, whereby the plug is designed to move and break out the frangible section upon attainment of a maximum filling pressure by said meat product within said casing, said plate means including said gate means further including a venting hole for releasing pressure caused by filling the casing, said section and hole being arranged so that the plug seals said hole as it breaks out said frangible section.

2. A casing structure as in claim 1, wherein the ends of the casing are secured around the periphery of the end plates.

3. A casing structure as in claim 2, wherein the means securing at least one casing end on the periphery of at least one plate comprises a beveled edge on said plate and a wedging means mounted on said edge and frictionally securing the casing ends between said wedging means and said beveled edge.

4. A casing structure as in claim 1, wherein said casing is generally tubular and said plate means are substantially round.

5. A casing structure as in claim 4, wherein said means securing at least one end of the casing to at least one plate comprises a beveled edge on the periphery of said plate and a mating wedging ring having a complimentary bevel on its inner surface whereby the tubular edge of the casing end is frictionally secured between said plate and said ring.

6. A casing structure as in claim 5, wherein said inner surface of said wedging ring and said periphery of said plate include additional locking means.

7. A casing structure as in claim 6, wherein said additional locking means comprises an annular projection on said wedging ring and an annular mating groove on the periphery of said plate.

8. A casing structure as in claim 1, wherein said gate means comprises a further valve with inwardly directed and tapered valving members.

9. A casing structure as in claim 8, and further including a casing hanging means on one of said plate means.

10. A casing structure as in claim 9, wherein said hanging means comprise integral loops on one of said plate means.

11. A casing structure as in claim 1 and further including casing hanging means on one of said plate means.

12. A casing structure as in claim 11, wherein said hanging means comprise integral loops on one of said plate means.

13. A casing structure as in claim 11, wherein said hanging means comprise conveyor chain engaging studs mounted on opposite sides of the plate means containing said gate means said studs being oppositely disposed with respect to one another and having oppositely extending portions terminating in right angle projection members, said members being adapted to engage between the links of said conveyor chain.

14. A casing structure as in claim 1, wherein said plate means are constructed of a plastic material.

15. A casing structure as in claim 14, wherein said casing ends are secured around the periphery of the end plates.

16. A casing structure as in claim 15, wherein the means securing at least one casing end on the periphery of at least one end plate comprises a beveled edge on said plate and a wedging means mounted on said edge and frictionally securing the casing ends between said wedging means and said beveled edge.

17. A casing structure as in claim 14, wherein said gate means comprises a self-sealing valve member, whereby the pressure of the meat product seals the valve when the casing is filled.

18. A casing structure as in claim 17 and further including casing hanging means on one of said end plates.

19. A casing structure as in claim 14, wherein said casing is generally tubular and said plate means are substantially round.

20. An improved meat product casing structure adapted for automated filling comprising a hollow, flexible, uniform volume casing of a predetermined length, plate means on opposite ends of said casing, said plate means having inner facing planar surfaces, means securing the ends of the casing to the plate means, one of said plate means including a gate means to allow a meat product to be inserted into the casing to fill it, venting means for releasing pressure caused by filling the casing, frangible release means in said one of said plates adapted to be severed from said plate frictionally mounted means for severing said frangible release means from said plate and closing said vent upon attainment of a maximum filling pressure by said meat product within the casing, and casing hanging means adapted for engagement with a casing conveying means.

21. The casing structure of claim 20, wherein said gate means comprises a self-sealing valve member, whereby the pressure of the meat product seals the valve when the casing is filled.

22. The casing structure of claim 20, wherein the plate means are constructed of a plastic material.

23. The method of filling a meat product casing having planar end plates and an intermediate flexible tubular casing, one of said end plates having a gate means therein for insertion of a filler horn adapted to supply a source of meat product, a flangible release means, a venting means for releasing the pressure caused by filling the casing and means for breaking said frangible release means from said plate and closing said venting means, comprising:
a. Securing the end plate containing the gate means, for filling the casing,
b. Inserting a filler horn into said casing through said gate means,
c. Filling the casing with a meat product paste while venting said casing until said breaking means breaks said frangible release means from said end plate,
d. Continuing filling said casing for a predetermined amount of time after said frangible release means is broken from said plate, until said venting means is closed
e. Withdrawing the filler horn from said casing, and
f. Sealing said gate means whereby said casing is completely filled with said meat product without any resulting air pockets.

* * * * *